United States Patent [19]

White et al.

[11] 4,248,485

[45] Feb. 3, 1981

[54] EARTH BORING BIT WITH TEXTURED BEARING SURFACE

[75] Inventors: James E. White, Irving; Santos Shields, Arlington, both of Tex.

[73] Assignee: Dresser Industries, Inc., Dallas, Tex.

[21] Appl. No.: 80,847

[22] Filed: Oct. 1, 1979

[51] Int. Cl.³ .............................................. F16C 33/10
[52] U.S. Cl. ..................................... 308/8.2; 308/241
[58] Field of Search .............. 308/8.2, 35, 78, DIG. 5, 308/168, 241; 175/371, 372

[56] References Cited

U.S. PATENT DOCUMENTS

| | | | |
|---|---|---|---|
| 3,235,316 | 2/1966 | Whanger | 308/8.2 |
| 3,784,264 | 1/1974 | Jackson | 308/8.2 |
| 3,839,774 | 10/1974 | Jackson | 29/149.5 R |

Primary Examiner—Lenard A. Footland

Attorney, Agent, or Firm—Fred A. Winans; Eddie E. Scott

[57] ABSTRACT

A rolling cutter earth boring bit is provided with load bearing surfaces that provide small lubricant reservoirs between the bearing interfaces. At least one of the bearing surfaces between the cutter and bearing pin is first ground, machined, etched or otherwise smoothed to an initial surface roughness of less than 20 $R_a$. The surface is then roughened by shot peening or other surface roughening techniques, such as electric discharge machining, chemical etching or other standard methods of roughening a surface. The desired roughness should have a value higher than about 20 $R_a$ and less than about 80 $R_a$. The roughening procedure is limited, generally with less than 50% of the surface area containing indentations. The indentations provide reservoirs for lubricant and a receptacle for debris in the bearing area. The smooth portions of the bearing promote rotation of the cutter on the bearing pin.

1 Claim, 4 Drawing Figures

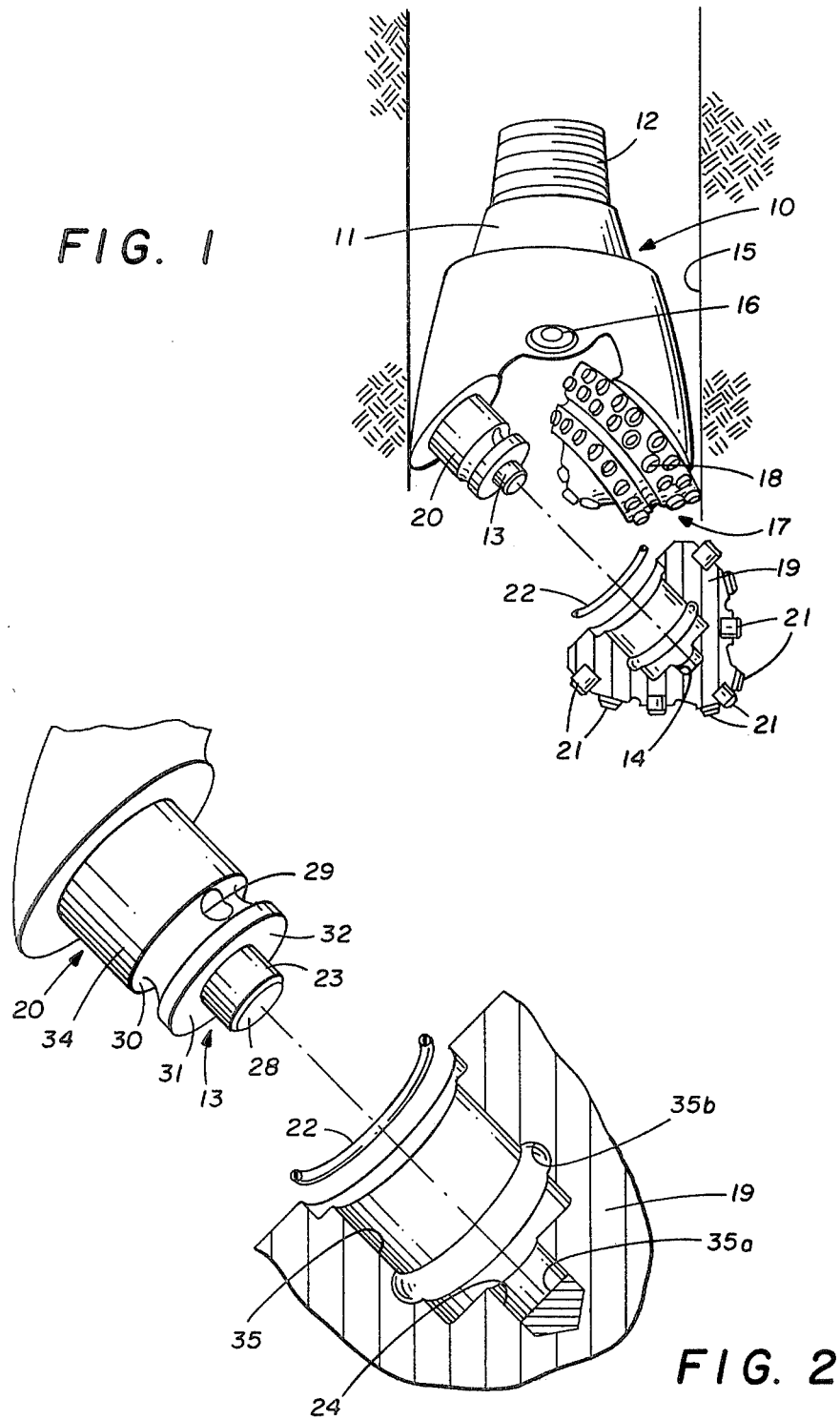

EARTH BORING BIT WITH TEXTURED BEARING SURFACE

BACKGROUND OF THE INVENTION

The present invention relates to the art of earth boring and, more particularly, to a rolling cone cutter earth boring bit. Earth boring bits of this type are adapted to be connected as a lower member of a rotary drill string. As the drill string is rotated, the bit disintegrates the formations to form an earth borehole. Generally, the bit includes a multiplicity of individual arms that extend angularly downward from the main body of the bit. The lower end of each arm is shaped to form a spindle or bearing pin. A rolling cone cutter is mounted upon each bearing pin and adapted to rotate thereon. Individual bearing systems promote rotation of the rolling cone cutter. These bearing systems have traditionally been roller bearings, ball bearings, friction bearings or a combination of the aforementioned bearings. The rolling cone cutters include cutting structure on their outer surfaces that serves to disintegrate the formations as the bit is rotated.

In addition to rotational forces, the bit is subjected to a thrust load during the earth boring operation. The weight of the drill string and/or the downward force applied by the rotary drilling equipment apply a substantial thrust load upon the earth boring bit. Since the thrust load is applied axially to the bit, a specific load area is produced on the lower side of each bearing pin. As the bit is rotated and moved through the earth formations, the load area tends to wear. This wear can result in erratic movement of the rolling cone cutter upon the bearing pin. Such erratic movement can cause difficulties with the sealing system of the bit. Further, the wear in the load area tends to deteriorate the bearing surface and reduces the lifetime of the bit.

In order to obtain high penetration rates with a rotary rock bit in some formations, it is necessary to apply heavy loads on the bit and to operate the bit at a moderate speed. With other formations only moderate loads are required, but the bit must be operated at relatively high speeds. The rotary rock bit operates under a highly corrosive environment and is subjected to temperature extremes. The drilling operation is often conducted thousands of feet underground wherein elevated temperatures are encountered. The bit is continually flushed by circulating drilling fluid to cool the bit and carry away the drill cuttings. This fluid is generally water with chemicals added to control water loss or to control viscosity and/or pH. These chemicals produce a corrosive drilling fluid. The drill cuttings, the materials encountered in the earth formations, barites added for fluid weight control, and the chemical composition of the drilling fluid combine to create a corrosive and abrasive drilling environment. In view of the previsously explained circumstances, it can be appreciated that a bearing system for a rotary rock bit must be constructed so that it will include exceptional performance characteristics within a limited geometrical configuration. Since the entire drill string must be withdrawn to replace a bit should it fail, it is highly desirable to have the bearing systems of the bit operate for an extended period of time.

DESCRIPTION OF PRIOR ART

A general summary of typical bearing systems used in prior art earth boring bits is set forth in U.S. Pat. No. 3,235,316 to J. R. Whanger patented Feb. 15, 1966. In U.S. Pat. Nos. 3,784,264 and 3,839,774 to G. C. Jackson, Jr., an earth boring bit bearing system having a pitted bearing surface is shown. The bearing surface of one relatively rotatable member of a friction bearing is grit blasted to give it a roughened surface in the range of 50 to 200 R.M.S. A reservoir containing lubricant having entrained particles of anti-galling material is connected to the friction bearing and serves as a source of anti-galling material. Particles of the anti-galling material are picked up by the roughened surface and a film of anti-galling material formed on the bearing surface.

SUMMARY OF THE INVENTION

The present invention provides an earth boring bit with a bearing system having small lubricant reservoirs between the bearing interfaces. Increased bit life results from the improved lubrication of the bearing surfaces and the overall improvement of the bit's lubrication system including the sealing system. At least one of the relatively rotatable bearing surfaces is ground, machined, etched or otherwise smoothed to an initial surface roughness of less than 20 $R_a$. The surface is then roughened by shot peening or by other surface roughening techniques, such as electric discharge machining, chemical etching or other standard methods of roughening a surface. The desired roughness should have a value higher than about 20 $R_a$ and less than about 80 $R_a$. The foregoing and other features and advantages of the present invention will become apparent from a consideration of the following detailed description of the invention when taken in conjunction with the accompanying drawings.

BRIEF DESCRIPTION OF THE DRAWINGS

FIG. 1 is an illustration of an earth boring bit constructed in accordance with the present invention.

FIG. 2 is an enlarged view of one of the bearing areas of the bit illustrated in FIG. 1.

DETAILED DESCRIPTION OF THE INVENTION

Figure 3:
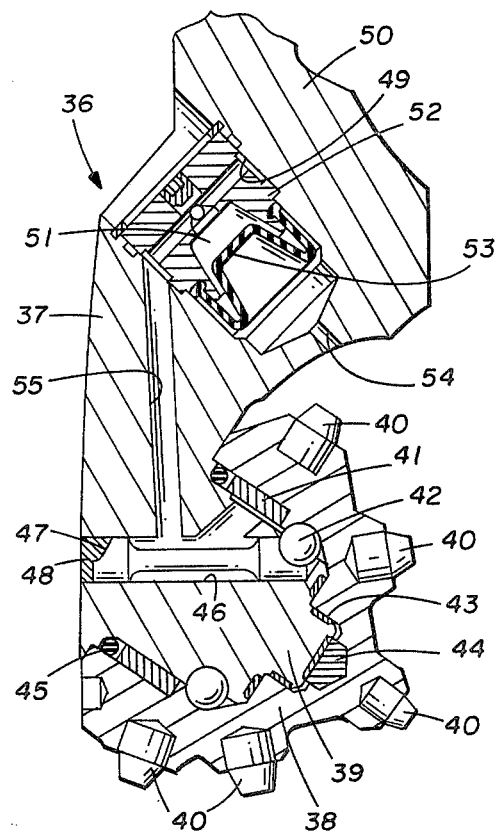
FIG. 3 is a sectional view of one arm of another embodiment of an earth boring bit constructed in accordance with the present invention.

Referring now to FIG. 1 of the drawings, a rolling cone cutter rotary rock bit 10 constructed in accordance with one embodiment of the present invention is illustrated. The body 11 of the bit 10 includes an upper threaded portion 12 that allows the bit 10 to be connected to the lower end of a rotary drill string. The bit 10 and drill string also include a central passageway extending along their central axes. Drilling fluid enters the bit 10 from the drill string section immediately above and passes downward through jet nozzles 16 to the bottom of the well bore 15 to flush cuttings and drilling debris from the well bore 15. The drilling fluid carries the cuttings and drilling debris upward in the annulus between the wall of the borehole 15 and the outside of the bit 10 and drill string to the surface. The drilling fluid is generally water with chemicals added to control water loss or to control viscosity and/or pH. These chemicals create a highly corrosive fluid. The drill cuttings, the materials encountered in the earth formations, barites added for fluid weight control and other added materials, and the chemical composition of the drilling fluid combine to create a corrosive and abrasive drilling environment. The bearing system for the bit 10 must be constructed so that it will include exceptional performance characteristics within a limited geometrical configuration. Since the entire drill string must be withdrawn to replace the bit 10 should it fail, it is highly desirable to have the bearing systems of the bit operate for an extended period of time.

Individual bearing pins extend from the body 11 of the bit 10. A first cutter 17 is rotatably positioned on the journal portion or bearing pin of a first arm and adapted to disintegrate the earth formations as the bit 10 is rotated. The cutting structure 18 on the surface of cutter 17 contacts and disintegrates the formations in a manner that is well known in the art. A second cutter 19 is rotatably positioned on the journal portion or bearing pin 20 of a second arm and adapted to disintegrate the earth formations as the bit 10 is rotated. The cutting structure 21 on the surface of cutter 19 contacts and disintegrates the formations in a manner that is well known in the art. The cutting structure 21 is shown in the form of tungsten carbide inserts. However, it is to be understood that other cutting structures such as steel teeth may be used as the cutting structure on the rolling cone cutter 19 and rolling cutter 17.

Bearing systems are located in the bearing area between the cutter 19 and the bearing pin 20. An O-ring seal 22 is positioned between the cutter 19 and the bearing pin 20. This seal 22 retains lubricant in the bearing area around the bearing systems and prevents any materials in the well bore 15 from entering the bearing area. The pilot pin 13 of the bearing pin 20 extends into the recess 14 in the rolling cutter 19 and provides a thrust bearing system. This thrust bearing system comprising the nose of pilot pin 13 and recess 14 carry thrust loads applied axially to the bearing pin 20.

Referring now to FIG. 2, an enlarged view of the bearing area of the bit 10 is illustrated. The cutter 19 is rotatably positioned on the bearing pin 20 and adapted to disintegrate the earth formations as the bit 10 is rotated. The bearing pin 20 projects from the cutter receiving surface of the depending arm. A series of ball bearings bridge between the raceways 30 and 35B to insure that rotatable cutter 19 is axially locked on bearing pin 20. The rotatable cutter 19 is positioned upon bearing pin 20 and the series of ball bearings are inserted through a bore 29 extending into bearing pin 20. After the ball bearings are in place, a plug is inserted in the bore and welded therein.

A number of bearing systems are located between the bearing pin 20 and cutter 19 to promote rotation of cutter 19. A thrust button 35A is located in the nose of cutter 19. The end 28 of nose 13 of the bearing pin 20 contacts the thrust button 35A. The outer bearing surface 34 on the bearing pin 20 and the outer surface 35 on rolling cutter 19 form an outer bearing. The inner bearing surface 23 on nose 13 and the inner bearing surface 24 in the recess 14 of the rolling cutter 19 form an inner bearing.

In addition to rotational forces, the bit 10 is subjected to a thrust load during the earth boring operation. The weight of the drill string and/or the downward force applied by the rotary drilling equipment apply a substantial thrust load upon the earth boring bit 10. Since the thrust load is applied axially to the bit, a specific load bearing area is produced on the lower side of the bearing pin 20. As the bit 10 is rotated and moved through the earth formations, the load bearing areas tend to wear. This wear can result in erratic movement of the rolling cone cutter 19 upon the bearing pin 20. Such erratic movement can cause difficulties with the sealing system of the bit. Further, the wear of the load bearing area tends to deteriorate the bearing surface and reduces the lifetime of the bit.

The present invention provides longer service life for the journal and thrust bearings and seal bearing surfaces in sealed, journal bearing rock bits. The operating conditions of a rock bit bearing are different than standard bearings used in other equipment, however, a discussion of standard bearing operations may be helpful in understanding the present invention. The standard bearing surfaces, however smooth to outward appearances, have some degree of roughness to their surface texture on a microscopic scale. These surface characteristics may be measured and characterized by use of suitable equipment. Where an adequate supply of pressurized lubricating oil is available and operating loads and speeds are such as to permit hydrodynamic lubrication of a bearing, a thin film of oil completely separates the two surfaces of the bearing and wear is practically non-existant during running. Only at start-up or stopping do the two surfaces of this type of bearing come in contact and experience rubbing and wear. For these conditions commercial bearings normally employ a very smooth surface. Surface roughness values of about 20 $R_a$ or less are typical.

Under conditions of high load and low speed, typical of journal bearing rock bits, the lubricant film is unable to keep the two surfaces completely separated during operating conditions. The highest peaks, or asperities, from one surface come in contact with the opposing peaks, or asperities, from the other surface. These collisions result in local peak deformation, yielding and local material failure as a peak is torn loose by the physical collision. This condition causes the physical drag known as friction. The change in surface contour is designated as wear. The debris resulting from material dislocation may in turn cause additional surface damage to the two adjacent moving surfaces. The end result of this accumulated damage is usually excessive bearing wear to the point of galling and finally seizure and failure of the bearing to provide the low friction service for which it was intended.

The typical prior art sealed journal bearing bit normally has relatively smooth surfaces and often employs infiltrated or embedded areas of softer materials such as copper or silver. Due to the high loads, 20,000 to 80,000 pounds, on a bit and the normal bit speeds of from 50 to 120 RPM, the bearings in the bit operate in a mixed boundary condition which permits asperity collisions as described above. Further commercial sealed journal bearing bits, based on published advertisements and technical journals, rely solely on an unpressurized supply of grease in the reservoir system which supplies grease to the bearings of these bits. Bearing failures are usually the most common failure mode of sealed bearing bits, particularly if they are of the type which use tungsten carbide inserts in the cone cutters. If the service life of the rock bit bearings can be extended beyond the current expected average life, then significant improvement will be made to drilling performance with resulting decrease in the cost of drilling.

In the present invention, the bearing surface 23, 24, 34, 28, 32, 35 and 35A are first ground, machined, etched or otherwise smoothed to an initial surface roughness of less than 20 $R_a$. The surfaces are then roughened, preferably by shot peening, or alternately by other surface roughening techniques, such as electric discharge machining, chemical etching or other standard methods of roughening a surface. The desired roughness varies with the application but should have a value higher than about 20 $R_a$ and less than 80 $R_a$. The roughening procedure is limited, generally with less than 50% of the surface area containing indentations. This has been termed "negative skew". The indentations provide reservoirs for lubricant and a receptacle for debris in the bearing area. The smooth portions of the bearing promote rotation of the cutter on the bearing pin.

The entire surface of both bearing interfaces should be surface textured as described above in the preferred form, but an alternate form involves treating only one of the two contact surfaces for a particular bearing. In the first step of the procedure it is necessary to have a relatively smooth surface of 20 $R_a$ or less. This is normally achieved by grinding. Then the surface is roughened by shot peening, vapor honing, chemical etching, electrical discharge machining or other techniques. This procedure should result in shallow, saucer-shaped depressions with an included angle of approximately 5 degrees from the surface. This provides an array of load carrying peaks, and a multiplicity of lubricant reservoirs surrounding these peaks. As the tips of some of the peaks are broken off due to normal wear, the reservoir depressions provide convenient locations for these debris particles, thus eliminating further galling and wear if these particles had continued along their initial path. In all cases the bearing must have, or be immersed in, a supply of oil or grease. This lubricant may be either pressurized or unpressurized and flowing as a result of a pump or pumping action or non-flowing.

To more fully understand the benefits derived from the use of the textured bearing surface of the present invention it is necessary to envision the natural or induced deformities of a surface on a microscopic level. The hills and valleys of a bearing surface may have a total height as small as 10/1,000,000 inch and as large as about 300/1,000,000 inch. The hills and peaks have typical slopes of only 4 to 10 degrees. Thus the peaks are in reality gently curved surfaces rather than sharp projections. The tops of these hills interact with the tops of hills on the mating surface both elastically and plastically in sliding or rolling bearing contact under load. These interacting surfaces are separated by a very thin film of grease, oil, or additives, as well as oxides and other chemically reacted films on either surfaces. In some areas the film is squeezed out and the interacting peaks actually weld together generating frictional heat. As the surfaces move relative to each other these welded peaks are torn apart, usually tearing some material away from the weaker surface material. This transferred material is then subject to being knocked off by subsequent interactions and goes tumbling between the opposing surfaces. This material is squeezed, deformed, cold worked and ground into smaller pieces which form the debris of wear, and may become welded again to one or the other surface. This debris may be analyzed by use of a Ferrograph, a laboratory equipment which is familiar to scientists who study the mechanics of wear. By use of that instrument the wear debris may be analyzed. One standard method is to segregate the debris particles. The ratio of number of large to number of small particles is designated the Wear Index and may be measured. Typically the Wear Index values are low and may be monitored with service life in a laboratory experiment by analysis of samples of lubricant obtained at various times during the bearing tests. When initial "wear-in" is complete the Wear Index assumes a low and essentially uniform value. As more debris accumulates, with normal bearing wear, the Wear Index gradually increases to some point where the Wear Index vs. time plot shows a large change in slope. At this point where Wear Index values are increasing rapidly, bearing failure is iminent. Scuffing (the transfer of metal from one surface to the other) and scoring (the cutting of grooves in one or both surfaces) has generally begun and limited future life is indicated for the bearing. Beyond lubricant film failure and local asperity welding, the factor which most contributes to this ultimate bearing failure is the accumulation of wear debris in the interface between the two bearing surfaces. In many applications, including the sealed journal rock bit bearing/lubricant system, it is impractical to filter the wear debris out of the lubricant. In a system such as a bearing with shot peened surfaces, the valleys provide suitable receptacles for the wear debris, thus eliminating these particles from contact with the actual interfaces of the two surfaces.

To provide suitable load carrying bearing areas, plus the valleys for trapping debris, (and in addition these valleys provide necessary reservoirs of lubricant) two approaches are possible. In both methods it is desirable to start with a surface which is ground to a smooth surface having an average ($R_a$) roughness value of about 20 micro-inches ($\mu$-in) or less.

In the first method this smooth surfacse is roughened by shot peening, or other suitable roughening methods, to a roughness value of not more than 100 $\mu$-in.

However, it is necessary that not all of the surface be roughened, 50 percent being a suitable value. This resulting surface will have a "negative skew", the definition of which will follow in terms of surface texture parameters. The essential meaning, however, is that there be a multiplicity of "peaks" at essentially the same elevation and these "peaks" providing adequate relatively smooth bearing surfaces of sufficient area to carry the applied load. Further, these load carrying surfaces are separated by relatively deep valleys which are filled with lubricant which constantly provides oil and/or additives to the adjacent peaks. In addition these valleys catch and store debris particles which fall therein.

A second method of obtaining desired surface texture which also is claimed in the subject patent includes the following.

For some very hard bearing surfaces it is difficult to achieve the condition of limited surface roughening. To achieve the desired surface roughness it may be necessary to prolong the duration of shot peening or other roughening process to the point where the total surface is roughened. An important difference between this method and other roughening methods is the resulting relative elevation of peaks. When the initial surface was very smooth, all peaks were at approximately the same height. When that initial requirement is not met, the tallest peaks will occur in clusters, resulting in excessive local pressure and damage to the peaks, creating excessive wear debris, galling and scoring.

Further, it is desirable (but not essential) that the peak heights of each opposing surface be roughened to about the same average values. Other combinations also provide optimum bearing conditions depending on relative surface hardness and with particular applications. In some cases it is desirable to have only one surface roughened in the manner discussed, while the other surface may be very smooth. The objection to having both surfaces smooth are the galling and scoring that occur when debris particles are trapped and rolled between two smooth surfaces.

For the cases where two surfaces have been roughened and are random in nature, the normal wear-in process tends to wear or plastically deform the peaks to some uniform elevation where suitable bearing area is provided for the applied loads. This new surface now has the characteristics of a negatively skewed surface and will provide longer bearing life than was possible with other surface conditions where very heavy loads and slow sliding velocities are involved. For those conditions it is not possible for hydrodynamic conditions to exist. In that type of bearing the loads are transmitted between surfaces via a thin layer of pressurized lubricant instead of asperity to asperity contacts. The former film lubrication condition is termed hydrodynamic lubrication; the latter is either mixed (where some of the load is carried by the oil film) or boundary (where most of the load is carried by the asperities).

To better understand the nomenclature used in discussing surface texture, a few necessary definitions follow.

$R_a$, Roughness Average, is the arithmetic average of the absolute values of the measured profile height deviations taken within the sampling length and measured from the centerline.

$R_T$, peak-to-valley height, is the maximum excursion above the centerline plus the maximum excursion below the centerline within the sampling length. Sampling length is normally 0.15 in.; $R_T$ is typically three or more times the roughness average. The assessment length consists of five consecutive sampling lengths. The assessment length with 0.030 cutoff is 0.15 in., but only 0.05 in. for 0.010 cutoff. These sampling lengths become important for non-uniform surfaces and those containing cracks. The smaller cutoff value generally gives much lower roughness values, but could dampen or enhance crack effects for the average calculated values of some parameters.

$R_{TM}$, is an average of the maximum $R_T$ values found in five consecutive sampling lengths.

tp%, bearing ratio, is a measure of the length of bearing surface along the measured profile (% of sampling length) after peaks have been theoretically cut off at specified depths, p, below the highest peak. This parameter is used to describe the shape of peaks, and is useful for evaluation and prediction of wear.

Pc, peak count, is the number of peak/valley pairs per inch projecting through a band of specified width, b, centered about the mean line.

Rp, peak height, is the maximum profile height from the mean centerline within the sampling length.

Rpm, average peak height, is the mean value of Rp over five consecutive sampling lengths.

The definition of "skew" is more complicated and involves an understanding of some simple terms and theories of probability which may be found in standard textbooks on that subject. Only a few simple concepts of that theory are relevant to the present bearing concept. These are "random distribution", "bell shaped distribution curves", "frequency", and the use of special "probability graph paper". The latter is a special type of graph paper the scales of which are devised such that a frequency plot of some parameter, such as asperity height above the mean centerline, for a parameter which is random will be a straight line. The departure from a straight line is defined as "skew" in the discussion of surface textures. Curvature in one direction is termed positive and negative in the opposite direction. When there are large flat peaks, separated by deep valleys of less occurrence, this is termed negative skew and is the desirable bearing surface texture. Several methods of obtaining an evaluation of skew are discussed below.

The best method which involves the probability terms mentioned above requires the use of special surface texture measuring equipment such as a Talysurf 5 (manufactured by Taylor-Hobson, Ltd.). There are a number of equivalent instruments by other manufacturers on the market. When a stylus of one of these instruments is passed over the surface of a bearing, each peak and valley height is measured and the information stored by suitable electronic components. The measurements are then converted from analog to digital (i.e. numerical values) processed by suitable "computer program", and then plotted. Two plots are generally available. The first is a distribution diagram which, for random occurrences, is a symmetric, bell shaped curve where the maximum value occurs at 50%. The plot is of some parameter, such as asperity height in this case, versus percent of times that value was found. The 50% value coincides with mean value. There is some value below which none are found. Similarly, there is some maximum value. If the percentage of each height, beginning with the smallest, are added cumulatively and the cumulative values are plotted versus asperity height on "probability paper" the resulting graph will be a straight line if the occurrences are random.

For some occurrence to be random, it must meet the following requirements.
1. Comprised of a number of repeated events which occur randomly. These events need not be identical.
2. The effects of these events must be cumulative (i.e. additive).
3. The events must be numerous.

Approximate methods of assessing skew may be used based on standard surface texture measurements defined previously. They include the following:
1. Measure bearing area (tp) at a value equal to peak height (Rp) and calculate skew (S*) as:

$$S^* = 0.5 - (tp\%/100)$$

2. Measure average $R_{TM}$ and $R_{pm}$ $$S^* = (2\ Rpm - RTM)/RTM$$

Referring now to FIG. 3, a sectional view of one arm 37 of a three cone rotary rock bit 36 incorporating another embodiment of the invention is shown. It is to be understood that the structures of the other two arms are substantially identical to the arm 37. A cutter 38 is rotatably positioned on the journal portion or bearing pin 39 of the arm 37 and adapted to disintegrate the earth formations as the bit 36 is rotated. The cutting structure 40 on the surface of cutter 38 contacts and disintegrates the formations in a manner that is well known in the art. The cutting structure 40 is shown in the form of tungsten carbide inserts. However, it is to understood that other cutting structures such as steel teeth may be used as the cutting structure on the cone cutter 38.

The body of the bit 36 includes an upper threaded portion that allows the bit 36 to be connected to the lower end of a rotary drill string (not shown). The bit 36 also includes a central passageway extending along the central axis of the bit to allow drilling fluid to enter from the upper section of the drill string (not shown) immediately above and pass downward to the bottom of the well bore to flush cuttings and drilling debris from the well bore.

A plurality of bearing systems are located in the bearing area between the cutter 38 and the bearing pin 39. The bearing systems in the bearing area include an outer friction bearing 41, a series of ball bearings 42, an inner friction bearing 43, thrust bearing 56, and a thrust button 44. An O-ring seal 45 is positioned between the cutter 38 and the bearing pin 39. This seal retains lubricant in the bearing area around the bearing systems and prevents any materials in the well bore from entering the bearing area. A passageway 46 allows the balls that make up the ball bearing system 42 to be inserted into position after the cone cutter 38 is placed on the bearing pin 39. The series of ball bearings 42 serves to lock the cone cutter 38 on bearing pin 39. After the balls are in place, a plug 47 is inserted into the passageway 46 and welded therein by weld 48. Plug 46 has a reduced diameter throughout the major portion of its length to allow lubricant to flow through the passageway 46.

A cylindrical reservoir chamber 49 is located in a bit body 50. A lubricant reservoir 51 containing a suitable lubricant is positioned in the lubricant reservoir chamber 49. The lubricant reservoir 51 consists of a lubricant reservoir canister 52 with a flexible diaphragm 53 attached. A vent passage 54 allows the pressure of the fluid in the borehole to be transmitted to the outside of the flexible diaphragm 53. A passage 55 extends from the lubricant reservoir 51 to the bearing area between the cutter 38 and the bearing pin 39. Lubricant in the lubricant reservoir 51 can flow through the passage 55 to the bearing area.

Figure 4:
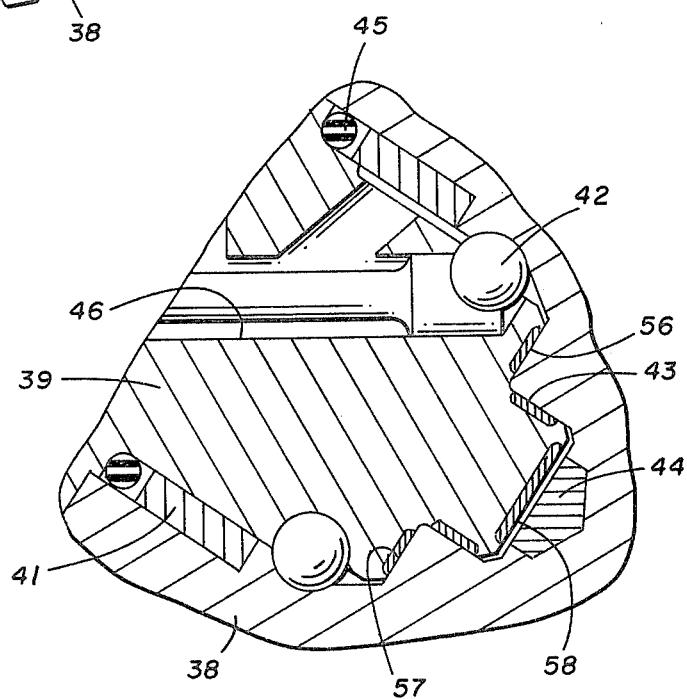
FIG. 4 is an enlarged view of the bearing area of the bit arm shown in FIG. 3.

Referring now to FIG. 4, an enlarged view of the bearing pin 39 and cutter 38 of the three cone rotary rock bit 36 is shown. The cutter 38 is rotatably positioned on the journal portion or bearing pin 39 and adapted to disintegrate the earth formations as the bit 36 is rotated. The bearing systems of the bit 36 include the outer friction bearing 41, the ball bearing system 42, the inner friction bearings 43 and 56, and the thrust button 44. The O-ring seal 45 is positioned between the cutter 38 and the bearing pin 39. This seal retains lubricant in the bearing area around the bearing systems and prevents any materials in the well bore from entering the bearing area. A thrust flange surface 56 on bearing pin 39 engages a thrust flange surface 57 on the inside of cone cutter 38. The inlay 58 in the nose of the bearing 39 contacts the thrust button 44.

The present invention provides longer service life for one or more of the bearing surfaces in the journal bearing rotary rock bit 36. The particular bearing surface is first ground, machined, etched or otherwise smoothed to an initial surface roughness of less than 20 $R_a$. The surface is then roughened, preferably by shot peening, or alternately by other surface roughening techniques, such as electric discharge machining, chemical etching or other standard methods of roughening a surface. The desired roughness varies with the application but should have a value higher than about 20 $R_a$ and less than about 80 $R_a$. The roughening procedure is limited, generally with less than 50% of the surface area containing indentations. The indentations provide reservoirs for lubricant and a receptacle for debris in the bearing area. The smooth portions of the bearing promote rotation of the cutter on the bearing pin. This procedure should result in shallow, saucer shaped depressions with an included angle of approximately 5 degrees from the surface. This provides an array of load carrying peaks, and a multiplicity of lubricant reservoirs surrounding these peaks. As the tips of some of the peaks are broken off due to normal wear, the reservoir depressions provide convenient locations for these debris particles, thus eliminating further galling and wear if these particles had continued along their initial path.

In the first step of the procedure it is necessary to have a relatively smooth surface of 20 $R_a$ or less. An alternate configuration of a bearing surface could include the use of a surface ground to some roughness value higher than 20 $R_a$, to 30 $R_a$ for example, and then roughen that surface to a value higher than 30 $R_a$ and less than 80 $R_a$, however, it is preferred for the initial smoothness to be 20 $R_a$ or less. The bearing must have, or be immersed in, a supply of oil or grease. This lubricant may be either pressurized or unpressurized and flowing as a result of a pump or pumping action or non-flowing. The oil or grease should be free of entrained particles that would normally fill the indentations.

The embodiments of the invention in which an exclusive property of privilege is claimed are defined as follows:

1. A bearing system for an earth boring bit, comprising:
   a bit body adapted to be connected to a rotary drill string;
   at least one bearing pin extending from said bit body, with said at least one bearing pin including a bearing pin bearing surface;
   a rotatable cutter mounted upon said at least one bearing pin, with said rotatable cutter including a cutter bearing surface;
   a quantity of indentations on at least one of said cutter bearing surface and bearing pin bearing surface giving said surface a roughness greater than 20 $R_a$ microinches and less than 80 $R_a$ microinches;
   substantially all of said at least one of said cutter bearing surface and bearing pin bearing surface not including said indentations having a roughness less than 20 $R_a$ microinches;
   a lubricant reservoir in fluid communication with the area between said bearing surfaces; and
   an uncontaminated lubricant in said reservoir.

\* \* \* \* \*